US005242089A

United States Patent [19]

[11] Patent Number: 5,242,089
[45] Date of Patent: Sep. 7, 1993

Knickerbocker et al.

[54] MINIATURE PUMP SPRAYER

[75] Inventors: Michael G. Knickerbocker; Edward J. Rodden, Jr., both of Upland, Calif.

[73] Assignee: Calmar Inc., City of Industry, Calif.

[21] Appl. No.: 827,443

[22] Filed: Jan. 29, 1992

[51] Int. Cl.[5] ............ G01F 11/30
[52] U.S. Cl. ............ 222/321; 222/496
[58] Field of Search ............ 239/333; 222/321, 380, 222/383, 384, 385, 496

[56] References Cited

U.S. PATENT DOCUMENTS

| | | | |
|---|---|---|---|
| 2,788,925 | 4/1957 | Ward | 222/402.2 |
| 3,187,960 | 6/1965 | Gorman | 222/380 X |
| 3,211,346 | 10/1965 | Meshberg | 222/321 |
| 4,025,046 | 5/1977 | Bovis | 222/385 X |
| 4,311,255 | 1/1982 | Meshberg | 222/321 X |
| 4,624,413 | 11/1986 | Corsette | 239/333 |
| 4,643,338 | 2/1987 | Iizuka | 239/333 X |
| 4,735,347 | 4/1988 | Schultz et al. | 222/321 |
| 4,871,692 | 10/1989 | Maerte | 222/321 X |
| 4,911,336 | 3/1990 | Blake | 239/333 X |
| 4,944,431 | 7/1990 | Blake | 222/380 X |

FOREIGN PATENT DOCUMENTS

| | | | |
|---|---|---|---|
| 2410796 | 9/1974 | Fed. Rep. of Germany | 222/321 |

*Primary Examiner*—Andres Kashnikow
*Assistant Examiner*—Kenneth Bomberg
*Attorney, Agent, or Firm*—Watson, Cole, Grindle & Watson

[57] ABSTRACT

A miniature pump sprayer has its pump cylinder mounted within a rigid vial and throttles product during pumping through a resilient disc valve or spring valve. A coaxial rod within a hollow piston plugs into a hollow tube extending toward the rod within the cylinder for valving the inlet closed during each pressure stroke of the plunger.

9 Claims, 2 Drawing Sheets

MINIATURE PUMP SPRAYER

BACKGROUND OF THE INVENTION

This invention relates generally to a manually operated pump sprayer of simple design with few moving parts especially adapted for dispensing small amounts of liquid product such as samples and/or concentrates of, for example, perfumes and colognes, from a connected vial of miniature form requiring no vent.

More particularly, the present pump sprayer, a throttle pump of the fingertip operated variety, has a plunger which supports an inlet valve probe which controls the inletting of product into the pump chamber, and a separate discharge valve mounted in the head.

Pump sprayers, exemplified by U.S. Pat. Nos. 4,025,046, 4,311,255 and 4,735,347, have a probe or sleeve operated by the plunger for controlling the inlet except that such pumps are of the pressure build-up variety requiring an independent valve sometimes referred to as a poppet valve which closes the inlet during the pressure stroke and which in response to the build up of pressure in the pump chamber, shifts independently of the plunger movement to open the discharge against the force of a return spring. Upon release of finger pressure applied against the head, the poppet valve shifts to close the discharge in response to spring pressure at the commencement of the return stroke of the plunger.

Non pressure build-up pumps are also known as exemplified by U.S. Pat. Nos. 3,211,346 and 2,788,925, in which a valve stem plugs into the inlet for controlling the product intake into the chamber during the pressure stroke, and a discharge port in the plunger stem is uncovered during the pressure stroke for opening the discharge.

SUMMARY OF THE INVENTION

It is therefore an object of the present invention to provide a pump sprayer having a simple construction with a minimum number of parts yet highly efficient in dispensing product from an attached vial of relatively small product capacity, the sprayer operating as a throttle pump with inlet and discharge control valves fixed within the plunger head.

The throttle pump sprayer according to the invention is mounted on a container, which may be in the form of a vial, of liquid product to be dispensed. A pump cylinder supporting a dip tube extends into the container, and a plunger head is mounted on the cylinder for reciprocation between pressure and suction strokes along the cylinder axis. The plunger head has a hollow pump piston which moves together with the head and defines a variable volume pump chamber with the cylinder, a return spring acting between the cylinder and the plunger. The plunger head has a discharge passage which includes the hollow piston and which terminates in a discharge spray cup mounted on the head. A discharge throttle valve is mounted within the head for controlling the discharge passage, and a hollow fixed tube within the cylinder communicates with the dip tube for inletting the product to the chamber during the suction strokes. The plunger head has a fixed rod or probe concentric to the piston which sealingly engages the inner wall of the tube during the pressure strokes for controlling the inlet to the pump chamber.

The discharge throttle valve may comprise an annular deformable disc valve or a resiliently biased axially shiftable ring valve.

The rod or probe fixed to the plunger head may have an irregularly shaped free end defining openings or passages with the hollow tube at or near the end of the suction strokes to ensure inletting of liquid product into the pump chamber.

The pump cylinder may be mounted wholly within the open end of the container to reduce overall size of the pump and vial assembly.

The nozzle cup or insert has a sleeve in engagement with a plug in on the head such that the disc valve is mounted on the plug and is retained in place by the insert sleeve. Otherwise, the nozzle insert is mounted about the plug which has an annular valve seat such that the ring valve extends between the nozzle insert and such seat.

The pump may have a plunger lock-up feature by the provision of at least one internal rib on the plunger head skirt extending in the direction of plunger reciprocation, and a radially extending flange on the cylinder having a groove received by the rib to permit plunger reciprocation, the head being rotatable about its central axis such that the rib engages a portion of the flange for locking the head in an up position against reciprocation.

The container may be ventless and have a rigid cylindrical wall for avoiding container collapse during the plunger suction strokes.

Other objects, advantages and novel features of the invention will become more apparent from the following detailed description of the invention when taken in conjunction with the accompanying drawings.

DETAILED DESCRIPTION OF THE INVENTION

Figure 1:
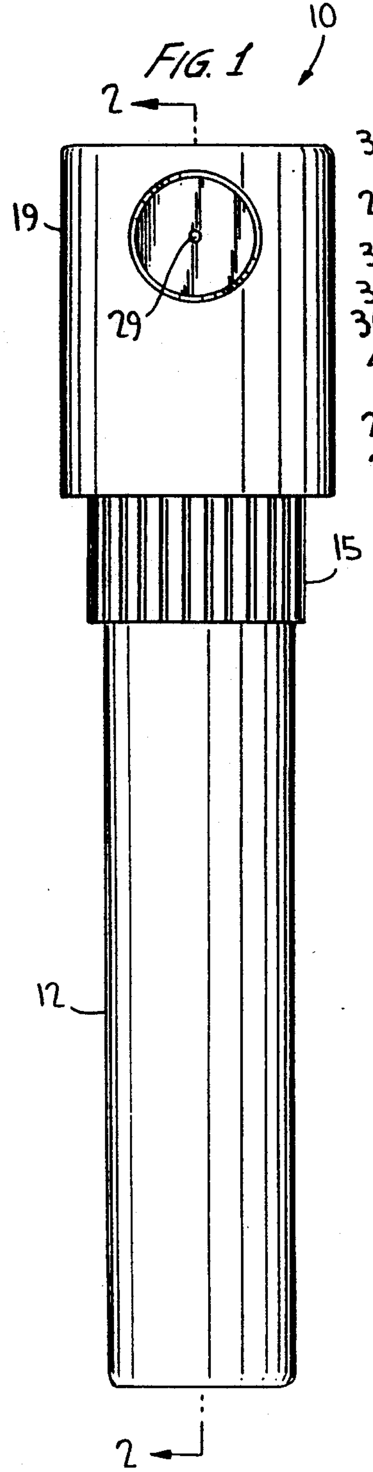
FIG. 1 is an elevational view of one embodiment of the pump sprayer according to the invention.
Figure 2:
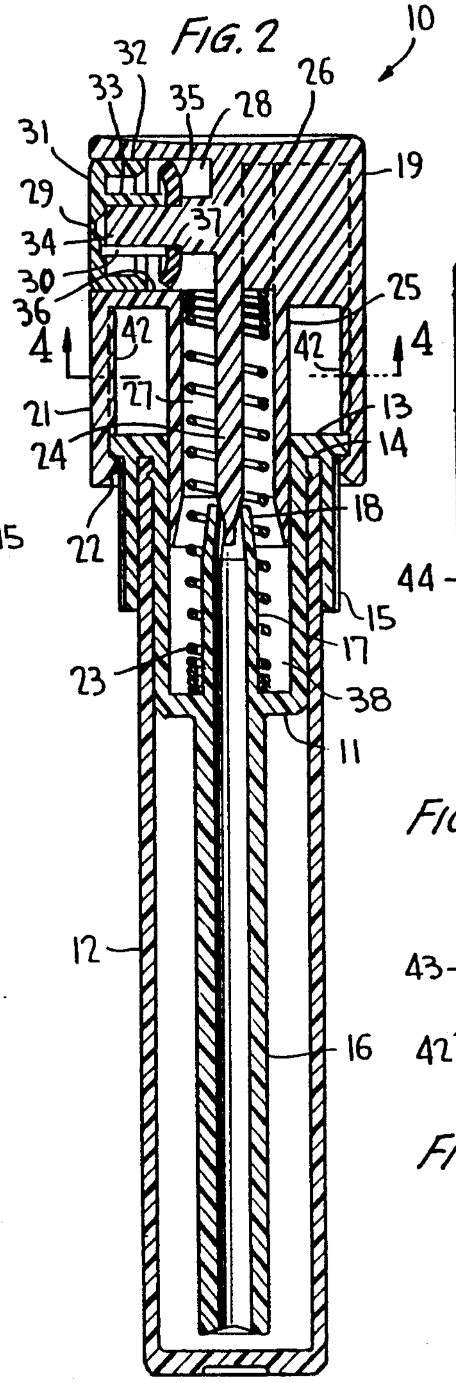
FIG. 2 is a longitudinal sectional view taken substantially along the line 2—2 of FIG. 1.

Turning now to the drawings wherein like reference characters refer to like and corresponding parts throughout the several views, the pump sprayer according to the invention is designated 10 in FIGS. 1 and 2 as comprising a pump cylinder 11 mounted to a container 12 which may be in the form of a vial containing product to be dispensed. The vial may be of rigid material such as glass or hard plastic.

The pump cylinder may be mounted wholly within the container at the mouth thereof as shown, the cylinder having a laterally extending flange 13 overlying free edge 14 of the container and a depending skirt 15 surrounding the container side wall for fixedly mounting the pump cylinder in place.

The cylinder has a depending dip tube 16 extending toward the bottom of the container, and an upstanding hollow tube 17 in communication with the dip tube. Tube 17 may be constricted at its upper end as at 18.

A plunger head 19 has a depending skirt 21 in engagement with flange 13 for mounting the head on the cylinder. Skirt 21 has inner projections or a continuous annular projection 22 engaging the underside of flange 13, and a return spring 23 extends between the underside of the plunger head and the bottom of the pump cylinder for maintaining the head in its position of non-use shown in FIG. 2.

The head also has a depending central probe 24 and a concentric hollow piston 25. The piston sealingly engages the inner wall of the pump cylinder and reciprocates therein between pressure and suction strokes along the central axis of the cylinder upon application and release of finger pressure applied to top 26 of the plunger head.

The head is formed with a discharge passage 27 defined in part by the hollow piston and an annular space 28 within the head and terminating in a discharge orifice 29 located in a nozzle cup or insert 31 fictionally mounted within the plunger head. The discharge cup has an outer skirt 32 in tight engagement with cylindrical wall 36 defining space 28, and has an inner cylindrical skirt 33 embracing a laterally extending plug formed integrally with the plunger head. Skirt 33 is notched as at 30 to provide communication between space 28 and orifice 29 via a swirl chamber (not shown) to effect a spray discharge as in the normal manner.

In the FIG. 2 embodiment, a discharge throttle valve in the form of an elastomeric annular and deformable disc 35 is seated along its outer edge against inner cylindrical wall 36. The disc engages plug 34 and is immobilized against axial shifting movement by inner skirt 33 which retains the disc valve in place against a shoulder 37 formed on plug 34.

In operation, after pump chamber 38, formed between the piston and cylinder, is primed with liquid, the application of finger pressure to the plunger head shifts the head downwardly when viewed in FIG. 2 whereupon probe 24 plugs into tube 17 and sealing engages therewith for valving the inlet closed. As downward movement of the plunger continues the pressurized product within the chamber is forced through the discharge passage deforming valve 35 away from its seat and out through the discharge orifice in the form of a spray. This type pumping action is referred to as a throttle pump action as product is simply throttled through the forced open discharge valve rather than relying on a pressure build up in the pump chamber to shift a poppet valve away from the discharge as in the category of pressure build-up sprayers.

Figure 5:
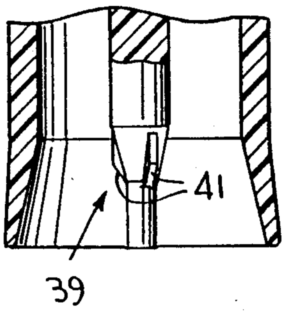
FIG. 5 is a vertical sectional view at an enlarged scale of a portion of the pump piston and the concentric probe showing the details at the end thereof.

Upon release of finger pressure applied to the head, a vacuum is created in the pump chamber during the return stroke as assisted by return spring 23. When the plunger approaches its position shown in FIG. 2, product is drawn from the vial up the dip tube and into the pump chamber through the inlet now formed between the constricted lower end 39 of rod 24 and the upper end of hollow tube 17. To insure free passage of product at or toward the end of the plunger return stroke, end 39 of rod 24 may be provided with a plurality of radially spaced projections 41 (FIG. 5) defining openings with constricted end 18 of hollow tube 17. Otherwise, lower end 39 may be of some other irregular shape.

Figure 3:
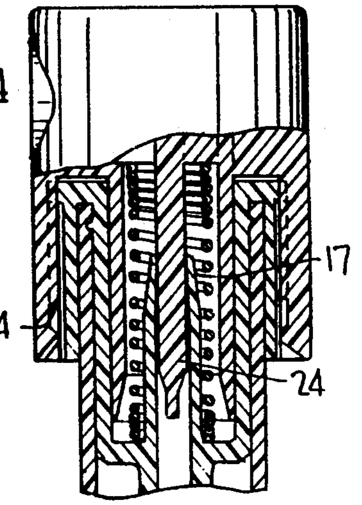
FIG. 3 is a view similar to FIG. 2 showing the plunger at or near the end of the pressure stroke.

FIG. 3 illustrates the condition of the plunger at or near the end of the plunger downstroke with probe 24 plugged into tube 17 for valving the inlet closed.

Figure 4:
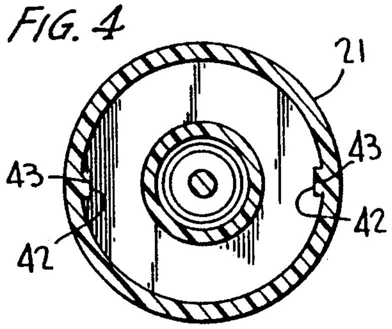
FIG. 4 is a transverse sectional view taken substantially along the line 4—4 of FIG. 2.

The plunger head may be locked in place in its up position, shown in FIG. 2 by the provision of one or more ribs 42 provided on the inner surface of skirt 21 of the plunger head (FIG. 4) and extending in the direction of plunger reciprocation. Flange 13 of the pump cylinder has a like number of grooves 43 extending in the same direction which, when aligned with ribs 42 upon rotation of the plunger head about its central axis, permits plunger reciprocation during a condition of use. To lock the plunger in its up position of FIG. 2, the plunger head is simply rotated about its central axis such that the ribs are out of alignment with the grooves and the lower end 44 (FIG. 3) of the ribs abut against the upper surface of flange 13. Indicia of some sort may be provided on the head to assist the user in orienting the ribs to match the grooves to facilitate plunger reciprocation.

Figure 6:
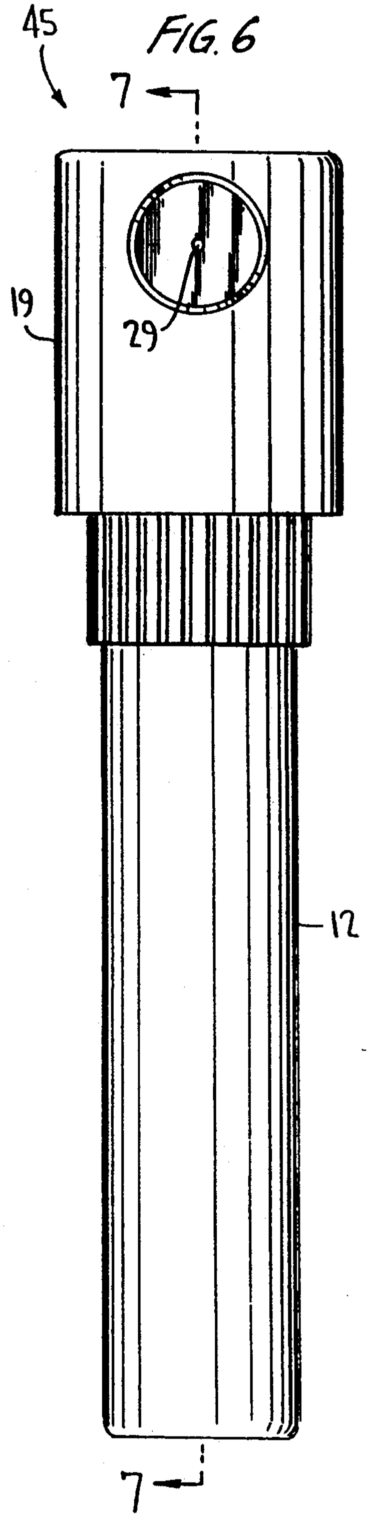
FIG. 6 is a view similar to FIG. 1 of another embodiment of a pump sprayer according to the invention.
Figure 7:
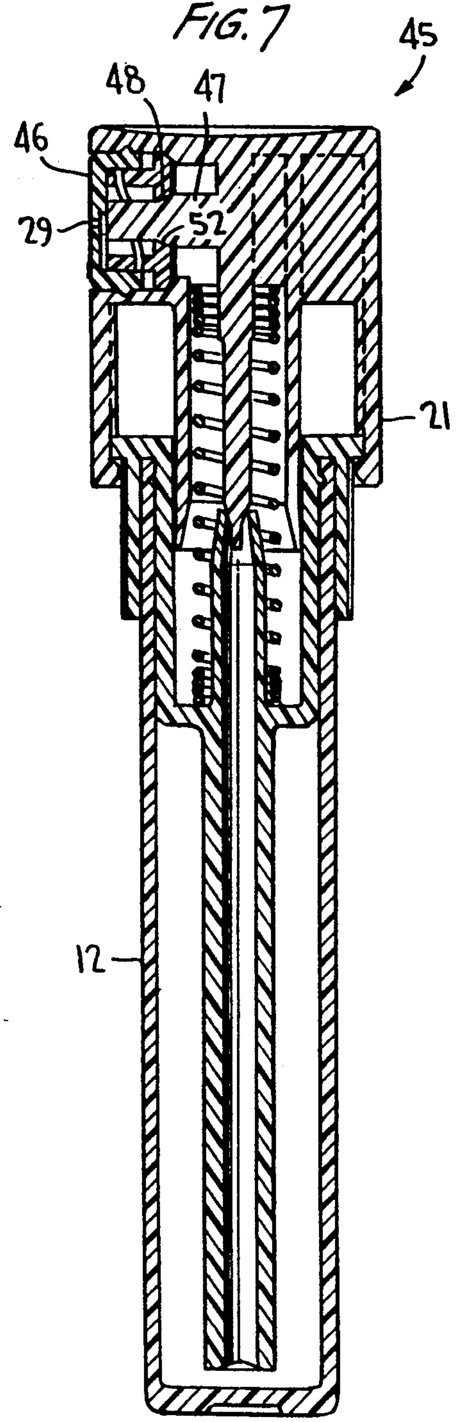
FIG. 7 is a longitudinal sectional view taken substantially along the line 7—7 of FIG. 6.
Figure 8:
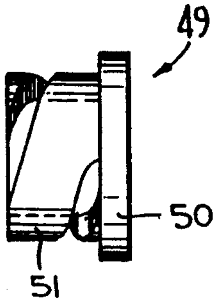
FIG. 8 is a perspective view of a discharge valve for the FIG. 6 embodiment.

A sprayer generally designated 45 is shown in FIGS. 6 and 7 according to another embodiment of the invention which is similar to sprayer 10 of FIGS. 1 to 5 except for the discharge valving.

Here, a discharge cup or insert 46 is fixedly mounted within the plunger head about transversly extending plug 47 having a conical valve seat 48 formed thereon. A discharge valve 49 (FIG. 6) having a valve ring 50 and an integral coil spring 51 extends between the inner wall of cup 46 and valve seat 48. The discharge valve ring has a complimentary inner conical wall 52 which in the at rest position of FIG. 7 sealingly engages valve seat 48.

The operation of the sprayer 45 is essentially the same as that described with reference to FIG. 2 except that during each pressure stroke the discharge valve simply compresses under the action of its integral spring such that wall 52 is moved by the liquid pump pressure away from its valve seat for opening the discharge to facilitate spraying through orifice 29.

In both embodiments sprayers 10 and 45 do not provide for container venting. The sprayers are miniaturized such that in actual size the vial may be less than one half inch in diameter and the overall height of the vial plus the sprayer structure may be less than two and one-half inches. The sprayer assembly of the invention may thus be used as a sampler capable of containing products such as perfume or cologne in such small volume as to be emptied after but a few strokes. Hence, there is no need for container venting. Besides, the vial may be of rigid plastic or glass which prevents container collapse during dispensing.

Many modification and variations of the present invention are made possible in the light of the above teachings. It is therefore to be understood that within the scope of the appended claims the invention may be practiced otherwise than as specifically described.

What is claimed is:

1. A ventless fingertip pump sprayer mounted on a container of liquid product to be dispensed, comprising, a pump cylinder supporting a dip tube extending into said container, a plunger head mounted on said cylinder for reciprocation between pressure and suction strokes along a central axis of said cylinder, a hollow pump piston fixed to said head for movement together therewith and defining a variable volume pump chamber with said cylinder, spring return means acting between said cylinder and said plunger head, said plunger head having a discharge passage including said hollow piston and terminating in a discharge spray means mounted on said head, a hollow fixed tube extending into said cylinder in communication with said dip tube for inletting the liquid product to said chamber at the end of said suction strokes, a solid rod affixed to said head for reciprocating movement together with said head, said rod being concentric to said piston and extending solely between opposite ends of said piston and sealingly engaging the interior of said hollow fixed tube during said pressure strokes for controlling the inlet to said chamber, and throttle valve means mounted within said head for controlling said discharge passage, said valve means being affixed within said head for reciprocating movement together therewith.

2. The sprayer according to claim 1, wherein said discharge throttle valve means comprises an annular deformable disc valve located in the path of said discharge passage.

3. The sprayer according to claim 1, wherein said discharge throttle valve means comprises a nozzle insert fixedly mounted within said plunger head and having a discharge orifice, said valve means further comprising an annular ring valve having an integral spring and being located within said insert for axial movement toward and away from said orifice.

4. The sprayer according to claim 1, wherein said rod has an irregularly shaped free end defining openings with said hollow tube at the end of said suction strokes to ensure inletting of liquid product into said chamber.

5. The sprayer according to claim 1, wherein said pump cylinder is mounted wholly within said open end of said container.

6. The sprayer according to claim 2, wherein said discharge spray means includes a nozzle plug mounted on said head for reciprocation together therewith, and a nozzle insert having a sleeve telescoped about said plug, said disc valve surrounding said plug and being retained in place by said insert sleeve.

7. The sprayer according to claim 3, wherein said discharge spray means includes a nozzle plug mounted on said head for reciprocation together therewith, said nozzle insert mounted on said head about said plug, said plug having an annular valve seat, and said ring valve extending between said nozzle insert and said valve seat.

8. The sprayer according to claim 1, wherein said pump cylinder has a radially extending flange containing at least one groove extending in the direction of plunger reciprocation, said plunger head having a skirt containing at least one inner rib parallel to said groove, said rib engaging said groove to permit plunger reciprocation, and said head being rotatable about the central axis thereof until said rib engages a portion of said flange for locking said head against reciprocation.

9. The sprayer according to claim 1, wherein said container has a rigid cylindrical wall for avoiding any container collapse during said suction strokes.

* * * * *